(12) United States Patent
Lin et al.

(10) Patent No.: US 8,848,352 B2
(45) Date of Patent: Sep. 30, 2014

(54) DISPLAY DEVICE

(75) Inventors: Huang-Pin Lin, New Taipei (TW);
Feng-Fu Hsu, New Taipei (TW);
Chan-Wei Lin, New Taipei (TW)

(73) Assignee: Amtran Technology Co., Ltd., New Taipei (TW)

(*) Notice: Subject to any disclaimer, the term of this patent is extended or adjusted under 35 U.S.C. 154(b) by 397 days.

(21) Appl. No.: 13/190,984

(22) Filed: Jul. 26, 2011

(65) Prior Publication Data
US 2012/0268867 A1    Oct. 25, 2012

(30) Foreign Application Priority Data

Apr. 20, 2011 (TW) .............................. 100113789 A (51) Int. Cl.
| | |
|---|---|
| H05K 5/00 | (2006.01) |
| H05K 7/00 | (2006.01) |
| G11B 33/02 | (2006.01) |
| A47G 1/10 | (2006.01) |
| A47B 96/06 | (2006.01) |
| E05C 5/02 | (2006.01) |
| H05K 5/02 | (2006.01) |
| F16M 11/10 | (2006.01) |
| F16M 13/02 | (2006.01) |

(52) U.S. Cl.
CPC ................. H05K 5/02 (2013.01); F16M 11/10 (2013.01); F16M 2200/08 (2013.01); F16M 13/02 (2013.01)
USPC ............ 361/679.26; 361/679.32; 361/679.36; 361/679.37; 361/679.57; 369/75.21; 248/316.5; 248/292.14; 74/142

(58) Field of Classification Search
USPC ............ 361/679.01, 679.02, 679.08, 679.09, 361/679.3, 679.55–679.59; 455/575.1, 455/575.3, 575.4, 575.8; 369/282, 291, 369/253, 44.16, 75.5; 248/80–88, 248/155.1–155.5, 166–173, 180.1–186.2, 248/229.1–231.51, 271.4, 292.14, 248/316.1–316.8; 74/141–169, 380–387; 439/60, 151–160, 327, 328, 331, 638
See application file for complete search history.

(56) References Cited

U.S. PATENT DOCUMENTS

| | | | |
|---|---|---|---|
| 6,053,410 A * | 4/2000 | Wike et al. ............... | 235/462.43 |
| 2005/0194287 A1 * | 9/2005 | Lien et al. .................... | 206/565 |
| 2006/0133016 A1 * | 6/2006 | North et al. ................... | 361/681 |

* cited by examiner

*Primary Examiner* — Jerry Wu
(74) *Attorney, Agent, or Firm* — Muncy, Geissler, Olds & Lowe, P.C.

(57) ABSTRACT

A display device includes a display panel, a base, a circuit module, and a wall mount bracket. The base includes a base body and a carrier pivoted around the base body. The display panel is disposed on the base body. The carrier is capable of swinging between a support position and a folded position relative to the display panel. The circuit module is disposed in the carrier and is electrically connected to the display panel. The wall mount bracket is disposed on a surface of the carrier and moves to an unexpanded position or an expanded position relative to the carrier through an extension plate, so as to increase a torque when the base supports the display panel to stand or be hung on a surface.

9 Claims, 10 Drawing Sheets

DISPLAY DEVICE

CROSS-REFERENCE TO RELATED APPLICATIONS

This non-provisional application claims priority under 35 U.S.C. §119(a) on Patent Application No(s). 100113789 filed in Taiwan, R.O.C. on Apr. 20, 2011, the entire contents of which are hereby incorporated by reference.

BACKGROUND

1. Technical Field

The present disclosure relates to a display device, and more particularly to a display device with a base capable of rotating relative to a display panel.

2. Related Art

With the rapid development of display technology, display devices such as liquid crystal display (LCD) screens and LCD televisions have gradually become the mainstream in the flat-panel display market. In structural design of such display devices, a display device usually includes a display panel and a base. Components such as a backlight module, a circuit module, and a loudspeaker are disposed in the display panel, so that the display panel is thick and heavy. With the increasing size of the display panel (for example, the display panel larger than 20"), the volume and the weight of the display panel also increase. Such increasing of the volume and weight will cause the center of gravity of the entire display device to shift toward the display panel. Therefore, affected by the volume and the weight of the display panel, the display device is likely to fall onto a ground, which further leads to the damage of the display panel or a fracture between the display panel and the base.

Accordingly, in the current design of the base, metal structural members wrapped in plastics or a weight block disposed in the base are usually used to shift the center of gravity of the display device toward the base, so that the center of gravity of the entire display device is lowered. Therefore, the damage resulting from the falling down of the display device and the fracture between the display panel and the base are prevented. However, in such configuration relation between the display panel and the base, the display device appears to be bulky and hard to be moved because of the heavy weight of the display panel and base.

Meanwhile, multiple holes for wall mounting are generally disposed on a back plate of the display panel, such that the display panel can be hung on a surface such as a wall surface. However, when the display device is switched from a standing mode to a hanging mode, the base needs to be removed from the display panel first. Then, an accessory or a specially designed kit for wall mounting is fixed on the surface and, on the other hand, fastened on the back plate of the display panel through the multiple holes for wall mounting, such that the display panel is hung on the surface through the kit. However, since the base needs to be removed form the display panel before assembling and fastening the kit for wall mounting, the wall mounting process of the display panel is troublesome and complicated. Besides, after the wall mounting process, the user will encounter the problem of how to store the base.

Moreover, in such disposition of hanging the display panel on the surface through the kit for wall mounting, since the kit for wall mounting is directly fastened to the back plate of the display panel, it needs to be considered whether the structural strength of the back plate of the display panel is strong enough to support the weight of the entire display panel so that the back plate of the display panel will not crack or depart from the display panel due to the overweight display panel. Therefore, the back plate of the display panel usually has considerable thickness or is made of metal materials with strong rigidity, which further increases the weight of the display panel.

In addition to the above problems, in such disposition of hanging the display panel on the surface through the kit for wall mounting, after the kit for wall mounting is fastened to the display panel, a tilt angle between the display panel and the surface is fixed. Therefore, when using the display device, if the user intends to adjust the viewing angle of the display panel, the user needs to find a proper manual tool to loosen the fixing components such as screws or bolts between the kit for wall mounting and the display panel before adjusting the tilt angle of the display panel. After the display panel is adjusted to a proper angle, the display panel is fixed again at the proper angle through the fixing components. Therefore, the operation is very complicated and troublesome. Besides, in the operating process, since the display panel is heavy, the user needs to hold the display panel while fastening the fixing components after the display panel is adjusted to the desired angle, which also greatly increases the difficulty of adjusting the viewing angle of the display panel.

SUMMARY

Accordingly, the present invention provides a display device that can prevent the problems in the prior art in which a conventional display device cannot have a thin and light display panel, and the conventional display device is hard to switch between a standing mode and a hanging mode.

In an embodiment, the present invention provides a display device, which comprises a display panel, a base, a circuit module, and a wall mount bracket. The base is combined with the display panel. The base comprises a base body and a carrier. The display panel is disposed on the base body. The carrier is pivoted around the base body and is capable of swinging between a support position and a folded position relative to the display panel. The circuit module is disposed in the carrier and electrically connected to the display panel. The wall mount bracket is disposed on a surface of the carrier and further comprises an extension plate which is capable of being moved between an unexpanded position and an expanded position relative to the carrier.

According to one embodiment of the present invention, with a disposition in which the carrier of the base can pivot around the base body, it is convenient to selectively make the display device stand on a working surface such as a table surface or be hung on a surface such as a wall surface. Moreover, in the display device, since the components, for example, a loudspeaker and the circuit module, are disposed in the base, the weight and thickness of the display panel are greatly reduced. Such that the display panel in the display device can adopt a thin and light structural design, and the center of gravity of the display device is lowered toward the base, thereby the stability is improved when the base holds the display panel. Meanwhile, the extension plate can be moved to the expanded position relative to the carrier of the base, so as to protrude from one side of the carrier to increase the torque acting on the base while supporting the display panel. In this manner, the stability and the structural strength of the base holding the display panel are further enhanced. Besides, when the display device is hung on a plane, the fixing strength and the supporting strength of both the base and the wall mount are also enhanced.

DETAILED DESCRIPTION

The detailed features and advantages of the present disclosure are described below in great detail through the following embodiments, and the content of the detailed description is sufficient for persons skilled in the art to understand the technical content of the present disclosure and to implement the present disclosure there accordingly. Based upon the content of the specification, the claims, and the drawings, persons skilled in the art can easily understand the relevant objectives and advantages of the present disclosure. The following embodiments are intended to describe the present disclosure in further detail, but not intended to limit the scope of the present disclosure in any way.

Figure 1:
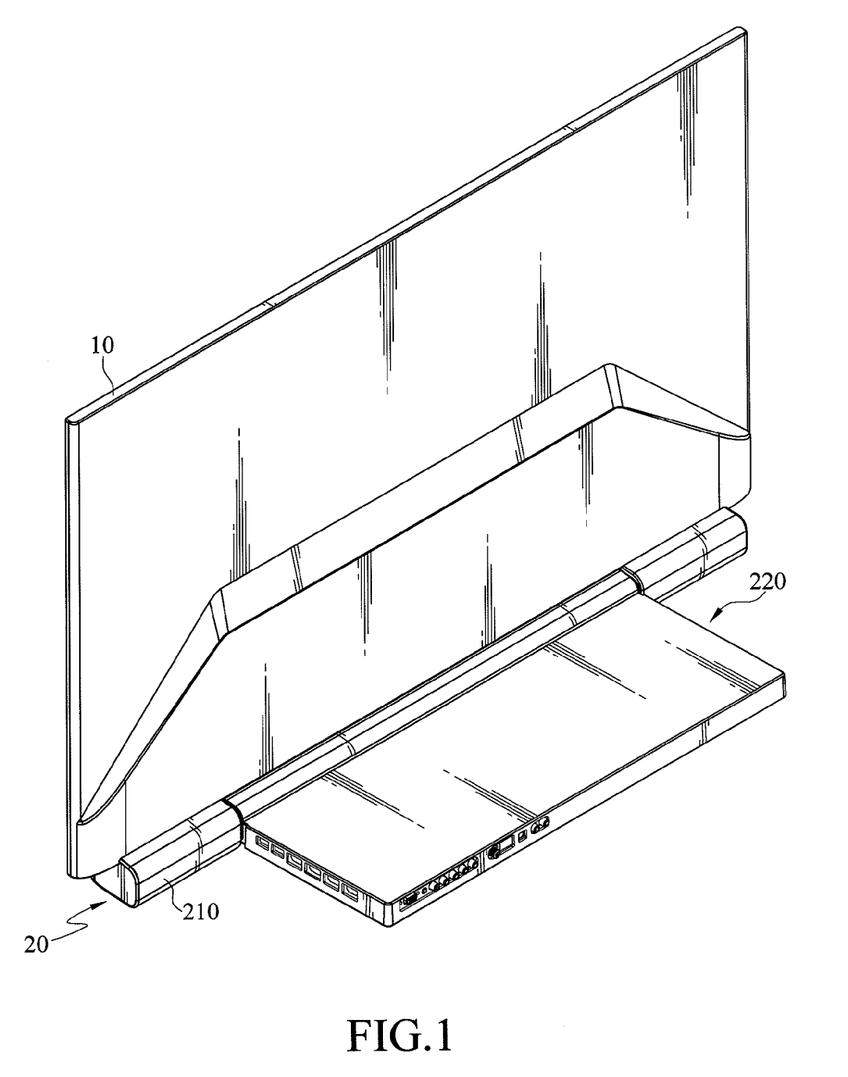
FIG. 1 is a schematic perspective view according to an embodiment of the present invention.
Figure 2:
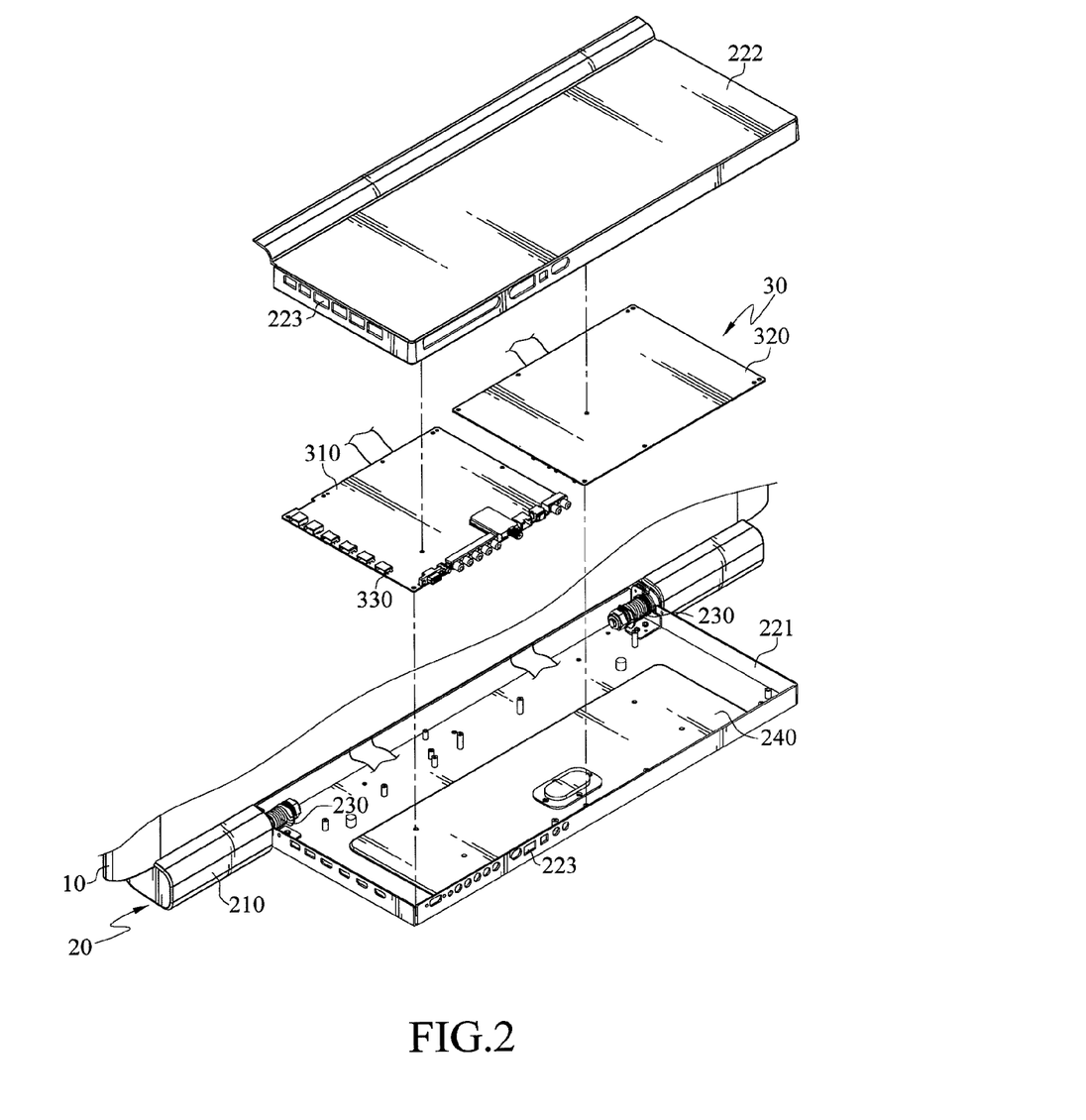
FIG. 2 is a schematic exploded view according to an embodiment of the present invention.
Figure 3:
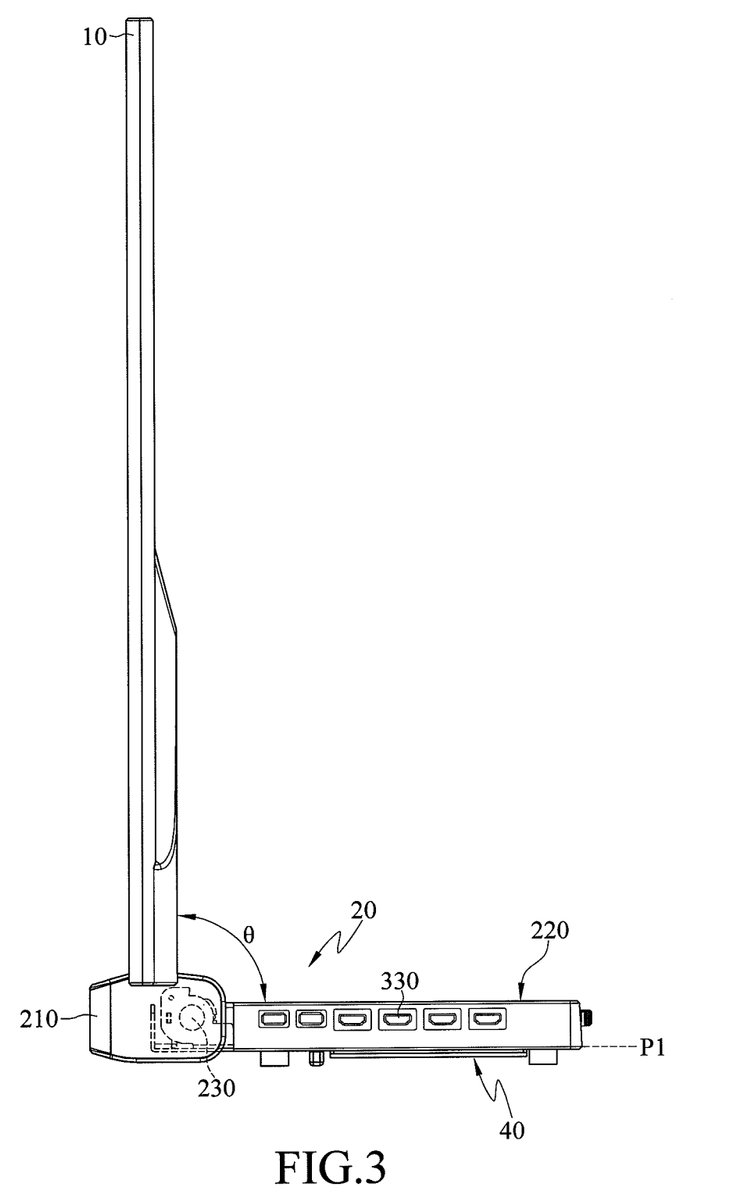
FIGS. 3 and 4 are schematic side views according to an embodiment of the present invention.

As shown in FIGS. 1 to 3, a display device according to an embodiment of the present invention comprises a display panel 10, a base 20, a circuit module 30, and a wall mount bracket 40. The display panel 10 may be, but is not limited to, an LCD panel, and the display panel 10 is screwed to the base 20 or connected with it in a detachable manner. The base 20 comprises a base body 210 and a carrier 220. The display panel 10 is held on a surface of the base body 210, and at least one shaft 230 is disposed on the base body 210. One end of the shaft 230 is fixed to the base body 210, and the other end of the shaft 230 penetrates the carrier 220. Such that the carrier 220 is pivoted around the base body 210 through the shaft 230 and may be swung within an angle θ smaller than or equal to 90 degrees relative to the display panel 10.

Figure 4:
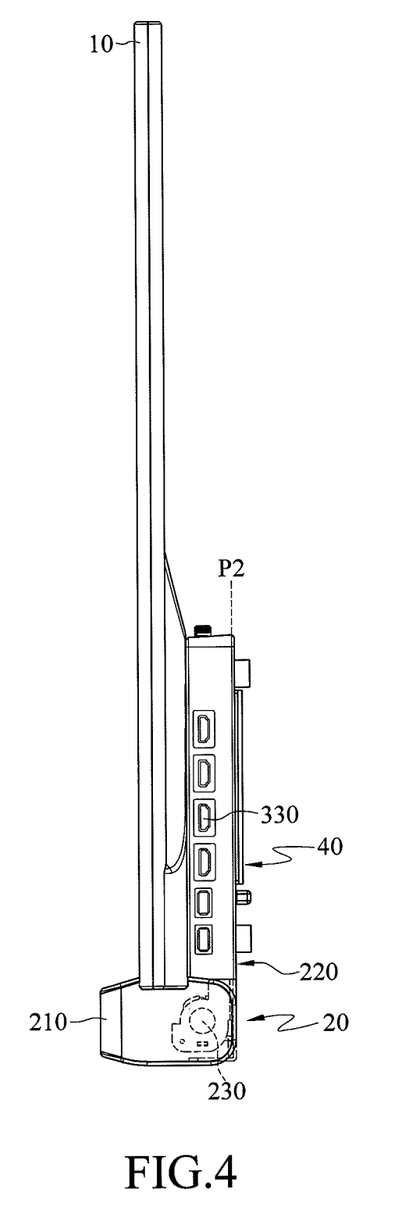

As shown in FIGS. 3 and 4, the carrier 220 may be pivotally rotated in a direction away from the display panel 10 through the shaft 230 and swings to a support position P1. At the support position P1, the angle between the carrier 220 and the display panel 10 is approximately in a range between 80 and 90 degrees. On the other hand, the carrier 220 can be pivotally rotated in a direction toward the display panel 10 and swings to a folded position P2. At the folded position P2, the angle between the carrier 220 and the display panel 10 is not greater than 20 degrees. In this embodiment, for example, when the carrier 220 is located at the support position P1, the angle between the carrier 220 and the display panel 10 is 90 degrees; when the carrier 220 is located at the folded position P2, the angle between the carrier 220 and the display panel 10 is 0 degree (that is, a surface of the display panel is parallel to a surface of the carrier). The above example is taken as an illustration, but the disclosure is not limited thereto.

Figure 5:
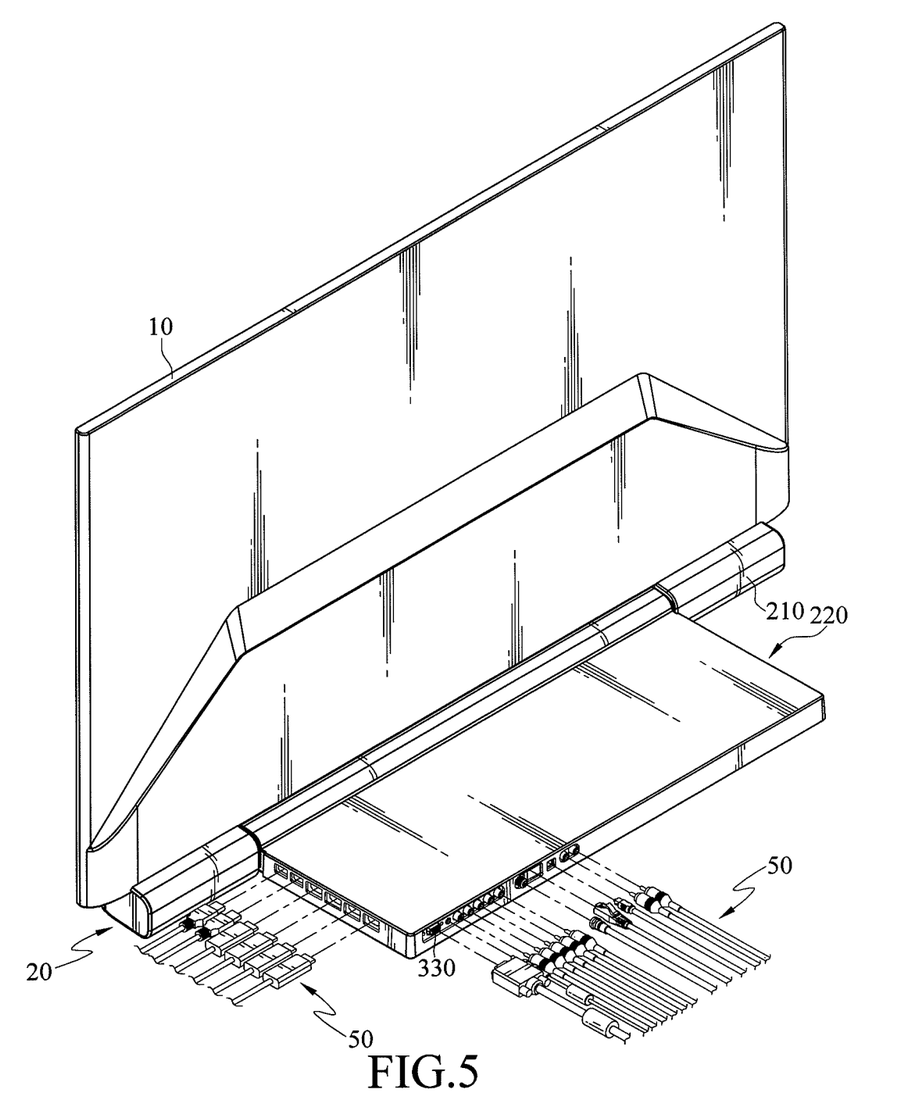
FIG. 5 is a schematic view of a using state according to an embodiment of the present invention.

In addition, the carrier 220 of the base 20 comprises a frame 221 and a cover plate 222. The carrier 220 is pivoted on the base body 210 through one end of the frame 221, and the cover plate 222 covers the frame 221 to form a case of the carrier 220. An accommodation space 240 is formed between the frame 221 and the cover plate 222. The circuit module 30 is disposed in the accommodation space 240 and electrically connected to the display panel 10. The circuit module 30 may be, but is not limited to, a module composed by circuit boards such as a signal control circuit board 310 and a power source control circuit board 320, for controlling the operation of the display panel 10. In addition, as shown in FIGS. 2 and 5, multiple through holes 223 are formed on the case of the carrier 220, so that the external electrical connection lines 50 can be connected to electrical connection ports 330 disposed on the circuit boards via the through holes 223.

Meanwhile, at least one loudspeaker (not shown) is disposed on the base body 210 of the base 20, and the loudspeaker is respectively electrically connected to the display panel 10 and the circuit module 30. Therefore, through respectively placing the loudspeaker and the circuit module 30 both having considerable weight in the base body 210 and the carrier 220 of the base 20, the entire weight of the display panel 10 is greatly reduced. The display panel 10 of the display device can then employ a thin and light structural design, and the center of gravity of the entire display device can be lowered, thereby enhancing the stability when the display device is placed on the working surface such as a table or wall surface through the base 20.

As shown in FIGS. 2, 3, and 6 to 8, the wall mount bracket 40 of the display device is disposed on the frame 221 of the carrier 220. The wall mount bracket 40 comprises an extension plate 410 and two guiding plates 420, and the wall mount bracket 40 is disposed on a surface of the frame 221 used for contacting the working surface. The two guiding plates 420 are respectively disposed on two opposite sides of the extension plate 410 and partially press the two opposite sides of the extension plate 410, such that the extension plate 410 is clamped between the two guiding plates 420. The extension plate 410 is capable of being moved to an unexpanded position P3 or an expanded position P4 through the guide of the two guiding plates 420. The extension plate 410 is capable of being moved toward the interior of the carrier 220 along the two guiding plates 420 to the unexpanded position P3 at which the extension plate 410 is completely embedded in one side of the frame 221. The extension plate 410 may also be moved toward the exterior of the interior of the carrier 220 along the two guiding plates 420 to the expanded position P4 at which at least part of the extension plate 410 is exposed out of the side of the frame 221, thereby extending the width of the carrier 220 outwardly.

Figure 6:
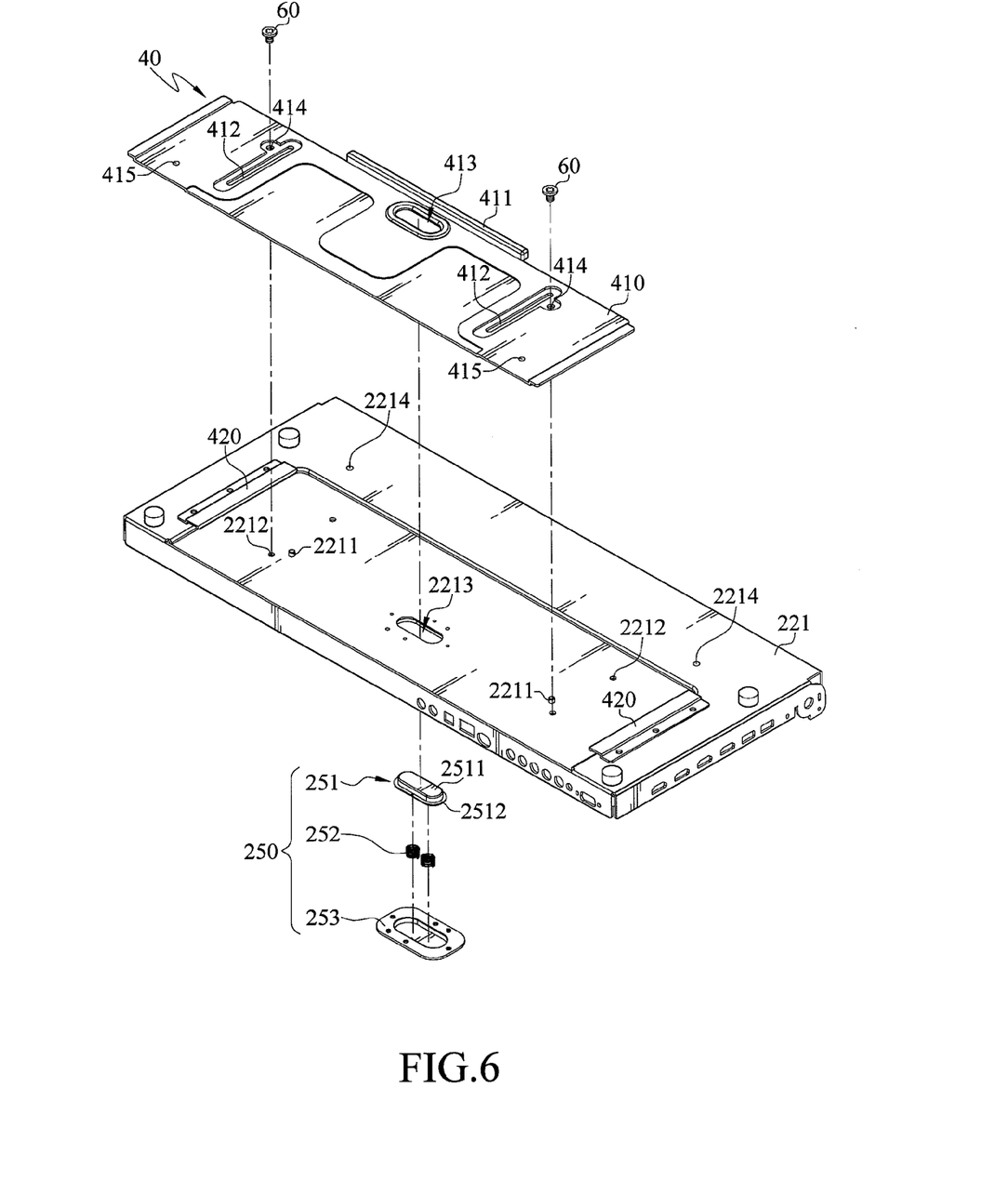
FIG. 6 is a schematic exploded view of a wall mount bracket according to an embodiment of the present invention.
Figure 7:
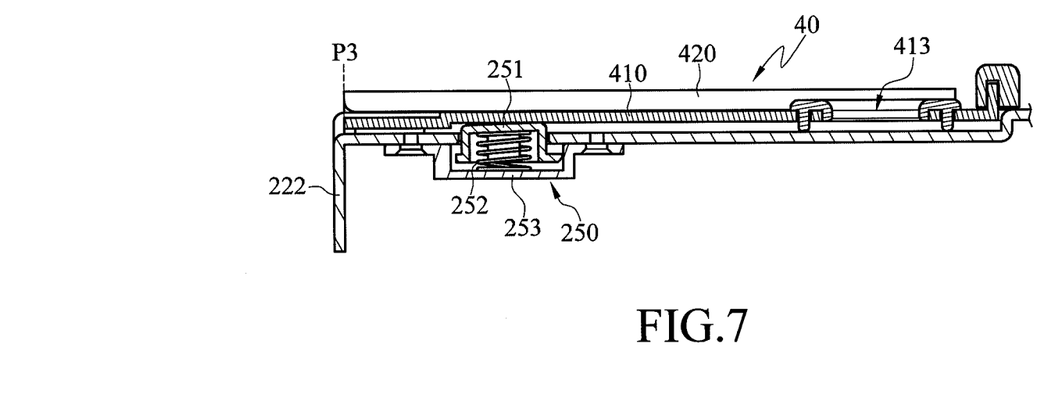
FIG. 7 is a schematic side view of a wall mount bracket according to an embodiment of the present invention.
Figure 8:
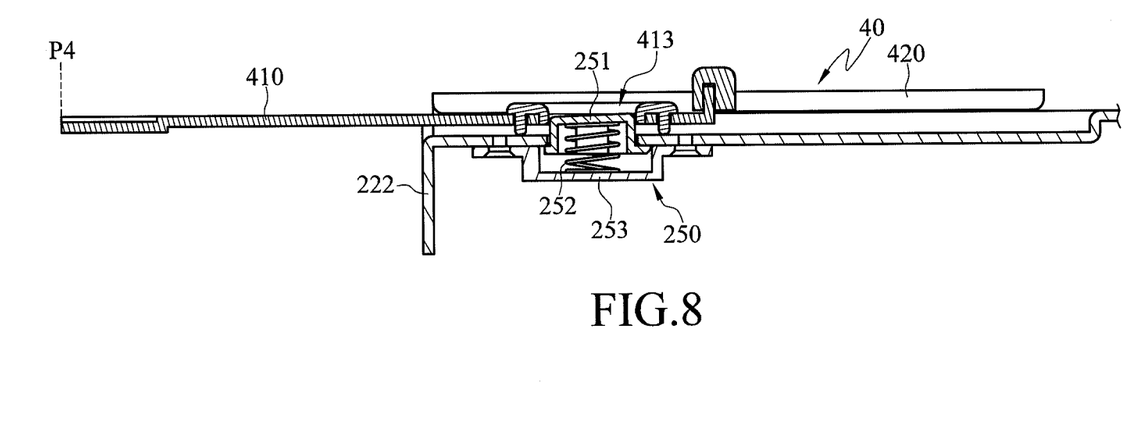
FIG. 8 is a schematic view of actuation of a wall mount bracket according to an embodiment of the present invention.

In addition, an braking component 411, two sliding slots 412, and a positioning hole 413 are disposed on the extension plate 410. The braking component 411 is disposed on one side of the extension plate 410 and protrudes from the surface of the extension plate 410 for the user to exert a force on the braking component 411. Such that the extension plate 410 is capable of being pushed to move back and forth between the unexpanded position P3 and the expanded position P4. The two sliding slots 412 and the positioning hole 413 pass through the two opposite surfaces of the extension plate 410. The two sliding slots 412, extending in a direction from the unexpanded position P3 to the expanded position P4, are disposed and spaced out an interval on the extension plate 410. The positioning hole 413 is formed between the two sliding slots 412. Meanwhile, two limiting components 2211 are disposed on the frame 221 of the carrier 220, and the limiting components 2211 may be, but are not limited to, cylinders protruding from the surface of the frame 221. The two limiting components 2211 respectively correspond to the two sliding slots 412 of the extension plate 410. When the extension plate 410 is disposed on the frame 221, the two limiting components 2211 respectively pass through the two sliding slots 412 of the extension plate 410 to limit the capability allowing the extension plate 410 to freely move toward the two guiding plates 420, thereby improving the stability while the extension plate 410 move back-and-forth between the folding position P3 and the unfolding position P4.

The frame 221 of the carrier 220 further comprises multiple fixing holes 2212. The multiple fixing holes 2212 are respectively disposed at locations adjacent to limiting components 2211 on the frame 221. An interval exists between the two adjacent fixing holes 2212 which neighbor the same component 2211, and the width of the interval matches the length of the sliding slot 412 of the extension plate 410. Meanwhile, at each location adjacent to one sliding slot 412, a through hole 414 is formed on the extension plate 410, and the through hole 414 corresponds to one of the fixing holes 2212 when the extension plate 410 is located at the unexpanded position P3 or the expanded position P4. Therefore, the extension plate 410 can be temporarily fixed at the unexpanded position P3 or the expanded position P4 via a manner in that multiple fixing components 60, such as screws or bolts, penetrate the through holes 414 and the fixing holes 2212 with one end of each fixing component 60 being fixed on the extension plate 410, and the other end thereof being fixed on the frame 221 of the carrier 220.

In addition, in order to improve the structural strength when the extension plate 410 is temporarily fixed at the expanded position P4, a through hole 2213 can be formed optionally on the frame 221 of the carrier 220. The through hole 2213 corresponds to the positioning hole 413 of the extension plate 410 and penetrates the two opposite surfaces of the frame 221, in which an engagement component 250 is accommodated in the through hole 2213. The engagement component 250 comprises a keycap 251, at least one elastic component 252, and a bottom plate 253. The keycap 251 comprises a first end 2511 and a second end 2512 that are opposite to each other. The diameter of the first end 2511 of the keycap 251 is smaller than the inner diameter of the through hole 2213. Oppositely, the diameter of the second end 2512 of the keycap 251 is greater than the inner diameter of the through hole 2213. The keycap 251 passes through the through hole 2213 with the first end 2511 and leans against a surface of the frame 221 opposite to the cover plate 222 with the second end 2512. The elastic component 252 is disposed between the keycap 251 and the bottom plate 253. The elastic component 252 may be, but is not limited to, a compression spring and may also be a torsional spring disposed between the keycap 251 and the bottom plate 253. The bottom plate 253 is disposed on a surface of the frame 221 opposite to the cover plate 222 with the second end 2512 of the keycap 251 and the elastic component 252 clamped between the bottom plate 253 and the frame 221, and one end of the elastic component 252 leaning against the bottom plate 253 and the other end pushing the keycap 251. Therefore, the first end 2511 of the keycap 251 tends to protrude from another surface of the frame 221 opposite to the cover plate 222.

In operation, the extension plate 410 is located at the unexpanded position P3 in a normal state. At this position, the extension plate 410 presses on the keycap 251 of the engagement component 250, so that the keycap 251 compresses the elastic component 252 and is embedded in the frame 221 of the carrier 220. When a user pulls the braking component 411 of the extension plate 410 and pushes the extension plate 410 to move to the expanded position P4, the positioning hole 413 of the extension plate 410 suspends right above the engagement component 250. At this time, the original restoring force of the elastic component 252 applying on the keycap 251 of the engagement component 250 is released, so that the keycap 251 penetrates the positioning hole 413 of the extension plate 410 through the push of the elastic restoring force. Thus, the ability enabling the extension plate 410 to move freely along the two guiding plates 420 relative to the carrier 220 is restricted, and the extension plate 410 is temporarily fixed at the expanded position P4. In this manner, the structural strength and the stability of the extension plate 410 at the expanded position P4 are further enhanced.

If the user intends to move the extension plate 410 to the unexpanded position P3, the user only needs to press the keycap 251 to compresses the elastic component 252 to make the elastic component 252 embedded into the frame 221 of the carrier 220. Then, the user pulls the braking component 411 of the extension plate 410, such that the extension plate 410 presses the keycap of the engagement component again and is pulled to the unexpanded position P3. Therefore, the operation of expanding and contracting the extension plate 410 on the carrier 220 is rather convenient.

Figure 9:
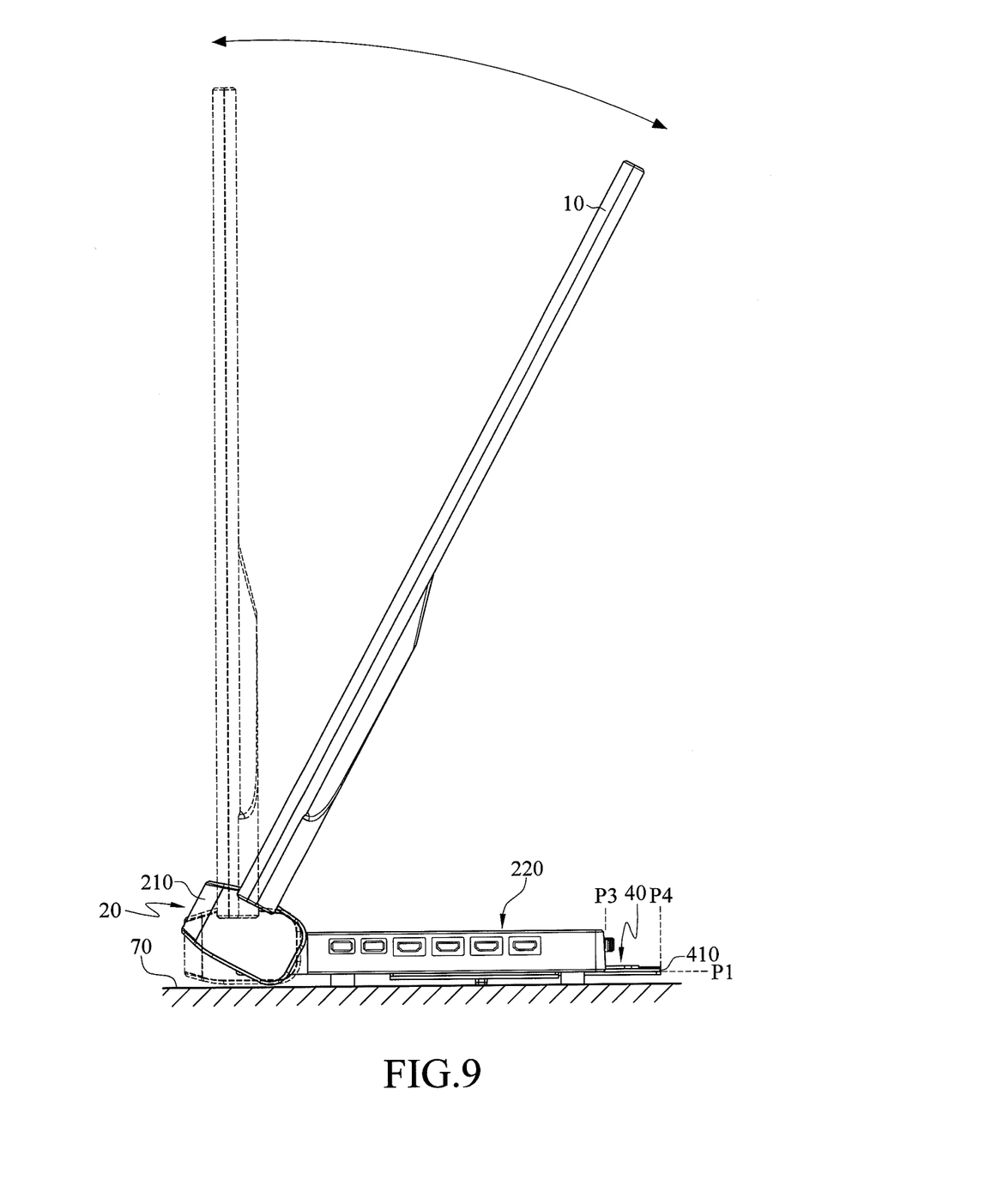
FIG. 9 is a schematic view of another using state according to an embodiment of the present invention.

FIG. 9 shows a configuration manner based on the preceding components. When the display device is used, the display panel 10 can be held on the working surface 70, such as the table surface or the ground, through the base 20. At this time, the carrier 220 of the base 20 is located at the support position P1, and the base 20 supports the display panel 10 on the working surface 70 through the base body 210 and the carrier 220, thereby the stability is enhanced. Moreover, through a disposition in which the base body 210 is pivoted around the carrier 220, the display panel 10 can pivotally rotate relative to the carrier 220 through the base body 210 to adjust a tilt angle of the display panel 10 toward the carrier 220. Therefore, the user can adjust a viewing angle according to personal preference; for example, the display panel 10 can tilt 7 to 10 degrees toward the carrier 220. As the tilt angle of the display panel 10 toward the carrier 220 increases, the center of gravity of the display device changes. At this time, the extension plate 410 of the wall mount bracket 40 can be pulled from the unexpanded position P3 to the expanded position P4, so that a torque acting on the base 20 generated by the working surface 70 is increased to compensate shift of the gravity center of the display device, which enhances the stability of the display device placed on the working surface 70 and avoids the display device falling on the working surface 70.

Figure 10:
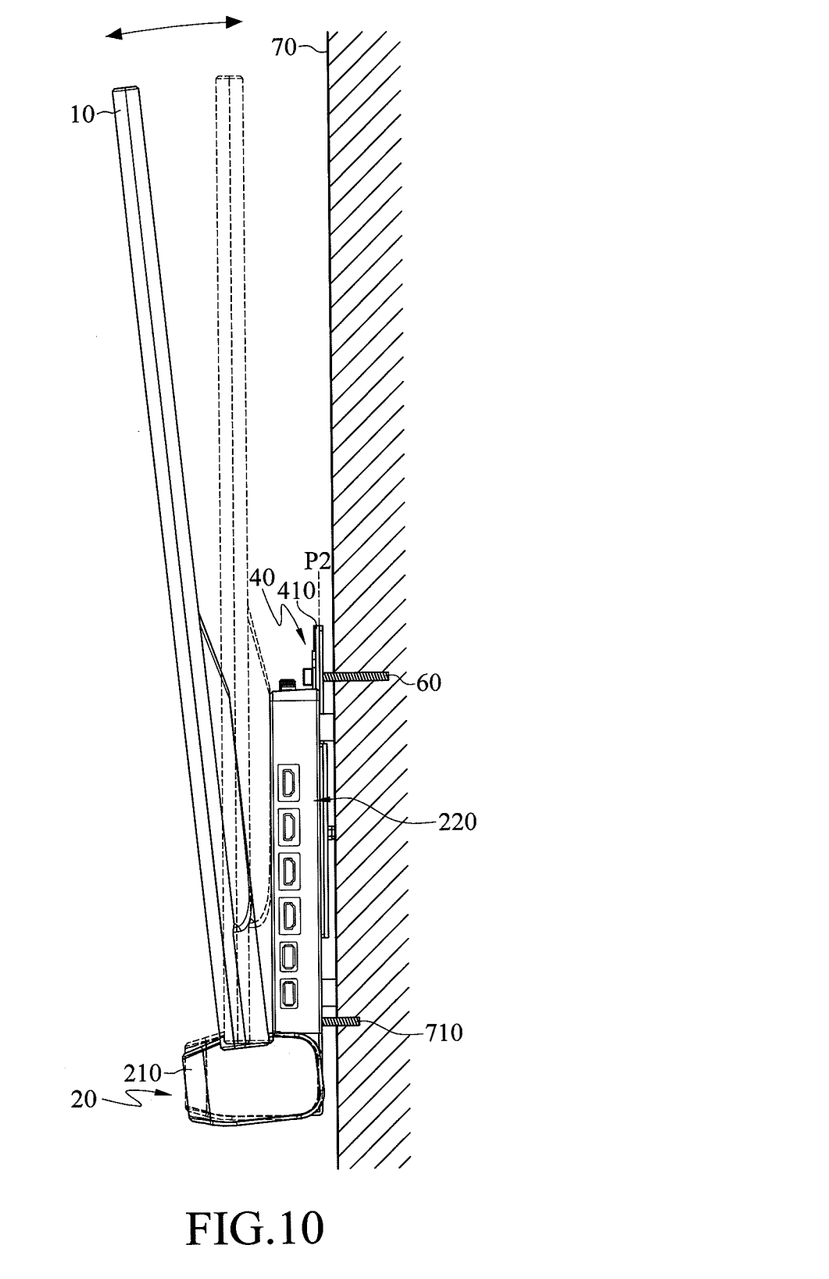
FIG. 10 is a schematic view of a wall mounting state according to an embodiment of the present invention.
Figure 12:
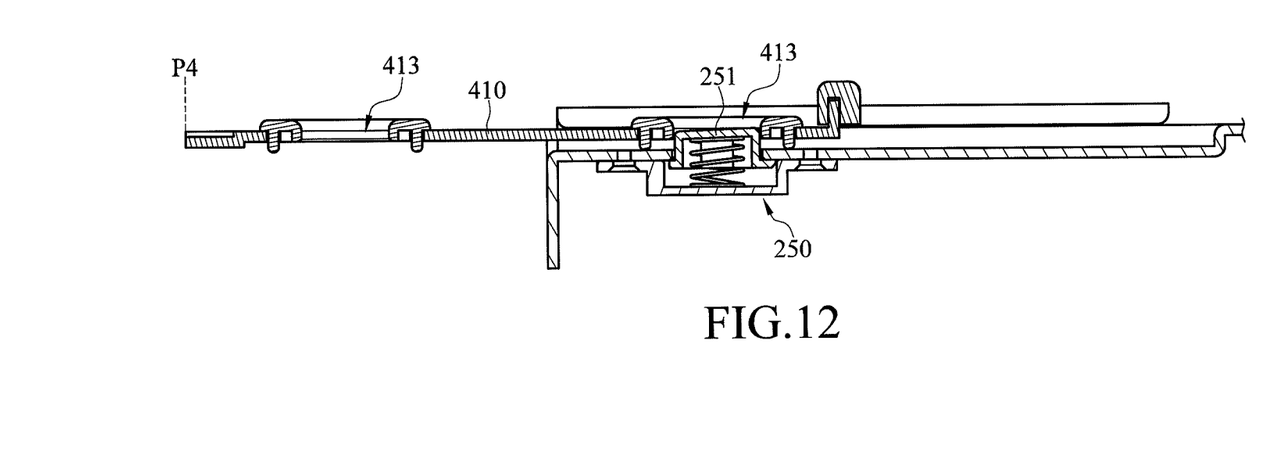

As shown in FIGS. 10 and 12, when the user requires hanging the display device on the wall, the user can directly pivotally rotate the carrier 220 of the base 20 to the folded position P2. Thus, the carrier 220 lies close to the display panel 10, and the hole for wall mounting 430 configured on the frame 221 of the carrier 220 (as shown in FIG. 6) is correspondingly fastened to a hook 710 disposed on the working surface 70, such as wall surface. The fixing components 60, such as screws or bolts, pass through the holes for wall mounting 430 configured on the extension plate 410 of the wall mount bracket 40 and is fixed on the working surface 70, so that the display device is hung on the working surface 70.

With respect to the carrier 220 of the base 20, the extension plate 410 of the wall mount bracket 40 is capable of being moved to the expanded position P4 to increase the support torque. When the extension plate 410 of the wall mount bracket 40 is located at the expanded position P4, at least a portion of the extension plate 410 is exposed out of the side of the carrier 220. Therefore, when fixing the extension plate 410, the user can choose the fixing components 60 with a considerable length to fix the extension plate 410 on the working surface 70. The fixing strength between the wall mount bracket 40 and the working surface 70 is enhanced by increasing depth of the fixing components 60 penetrating into the working surface 70, thereby avoiding the display device falling off from the working surface 70 and getting damaged. Furthermore, to obtain a better viewing angle, the user can also tilt the display panel 10 in a direction away from the working surface 70 through the disposition in which the base body 210 is pivoted around the carrier 220. For example, the user tilts the display panel 10 by 10 to 15 degrees away from the working surface 70.

Figure 11:
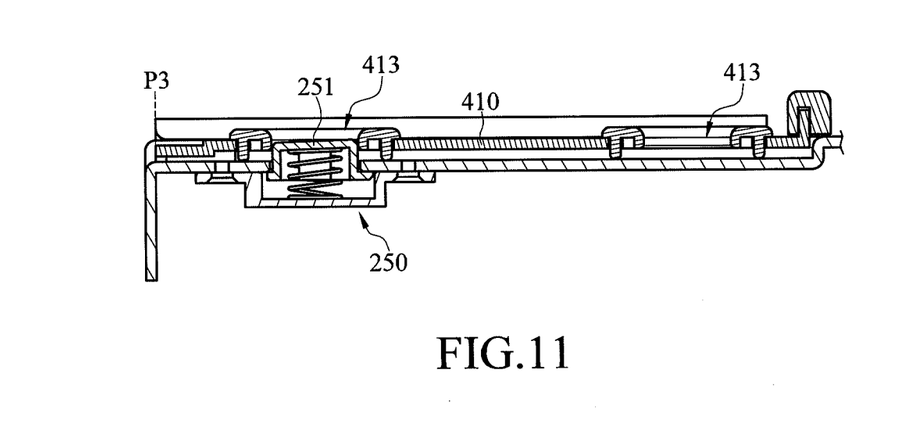
FIGS. 11 and 12 are schematic partial side views according to other embodiments of the present invention.

Moreover, in the display device according to the present invention, the extension plate of the wall mount bracket can be temporarily fixed at the expanded position through the keycap of the engagement component penetrating therein, thereby increasing the structural strength and stability when the extension plate is located at the expanded position. Therefore, as shown in FIGS. 11 and 12, in other embodiments of the present invention, the number of positioning holes 413 formed on the extension plate 410 can be increased, and two positioning holes 413 can be formed on the extension plate 410 with an interval. Thus, no matter if the extension plate 410 is located at the unexpanded position P3 or the expanded position P4, it can be temporarily fixed to the frame 221 through the keycap 251 of the engagement component 250 penetrating one of the positioning holes 413, and, therefore, there is no need to use additional fixing components.

According to the display device disclosed in the embodiment of the present invention, the base of the display device comprises the base body and the carrier pivoted around each other, such that the display panel can pivotally rotate through the carrier relative to the base body, so that the display device may stand or be hung on a working surface. Moreover, the display panel and the loudspeaker in the display device are disposed on the base body, and the circuit module and the wall mount bracket are disposed on the carrier so that the components like the loudspeaker and the circuit module can be omitted from the display panel, thereby the weight and thickness are greatly reduced and the center of gravity of the display device is lowered. As a result, the stability is enhanced when the base holds the display panel. Moreover, moving the extension plate of the base to the expanded position increases the torque supporting the display panel. This further enhances the stability and structural strength when the base holds the display panel, and the support strength when the carrier of the base and the extension plate of the wall mount bracket are fixed on the surface.

What is claimed is:

1. A display device, comprising:
   a display panel;
   a base, comprising a base body and a carrier, wherein the display panel is disposed on the base body, the carrier is pivoted around the base body, and the carrier is capable of being moved between a support position and a folded position relative to the display panel;
   a circuit module, disposed in the carrier, and electrically connected to the display panel; and
   a wall mount bracket, disposed on a surface of the carrier, wherein the wall mount bracket comprises an extension plate, and the extension plate is capable of being moved between an unexpanded position and an expanded position relative to the carrier;
   wherein the surface of the carrier comprises a through hole, an engagement component is disposed in the through hole, the engagement component normally protrudes from the surface and is embedded in the through hole along an axial direction of the through hole, the extension plate comprises at least one positioning hole, and the extension plate is temporarily fixed at the expanded position or the unexpanded position by penetrating the at least one positioning hole through the engagement component.

2. The display device according to claim 1, wherein the carrier swings within an angle smaller than or equal to 90 degrees relative to the display panel.

3. The display device according to claim 1, wherein the wall mount bracket further comprises two guiding plates, the two guiding plates are fixed on the surface of the carrier, and the extension plate is disposed between the two guiding plates and moves back and forth relative to the carrier through the guide of the two guiding plates.

4. The display device according to claim 1, wherein the surface of the carrier comprises at least one limiting component, the extension plate comprises at least one sliding slot, the at least one limiting component passes through the at least one sliding slot, and when the extension plate is located at the unexpanded position or the expanded position, the extension plate is retained on internal walls of the at least one sliding slot through the at least one limiting component and is connected to the carrier.

5. The display device according to claim 1, wherein the extension plate comprises two positioning holes, when the engagement component penetrates one of the two positioning holes, the extension plate is temporarily fixed at the expanded position, and when the engagement component penetrates the other one of the two positioning holes, the extension plate is temporarily fixed at the unexpanded position.

6. The display device according to claim 1, wherein the engagement component comprises a keycap, at least one elastic component, and a bottom plate, the bottom plate is disposed on another surface of the carrier opposite to the extension plate, the at least one elastic component is connected between the keycap and the bottom plate, and the engagement component protrudes from the surface of the carrier through the keycap.

7. The display device according to claim 6, wherein one end of the keycap passes through the through hole and protrudes from the surface of the carrier, and the other end of the keycap leans against another surface of the carrier opposite to the extension plate and is connected to the carrier.

8. The display device according to claim 1, wherein the wall mount bracket further comprises at least one fixing component, the at least one fixing component is detachably disposed on the extension plate, and when the extension plate is located at the unexpanded position or the expanded position, one end of the at least one fixing component is fixed on the extension plate, and the other end penetrates the extension plate and is fixed on the carrier.

9. The display device according to claim 1, wherein the surface of the carrier and the extension plate of the wall mount respectively have at least one hole for wall mounting thereon.

* * * * *